United States Patent
Padilla et al.

(10) Patent No.: US 12,550,916 B2
(45) Date of Patent: Feb. 17, 2026

(54) NANOFIBER SYSTEMS AS MEAT SUBSTITUTE

(71) Applicant: Board of Regents, The University of Texas System, Austin, TX (US)

(72) Inventors: Victoria Padilla, Edinburg, TX (US); Karen Lozano, McAllen, TX (US); Narcedalia Anaya-Barbosa, Edinburg, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 419 days.

(21) Appl. No.: 18/342,027

(22) Filed: Jun. 27, 2023

(65) Prior Publication Data

US 2023/0413856 A1 Dec. 28, 2023

Related U.S. Application Data

(60) Provisional application No. 63/376,314, filed on Sep. 20, 2022, provisional application No. 63/356,309, filed on Jun. 28, 2022.

(51) Int. Cl.
| | | |
|---|---|---|
| A23J 3/22 | (2006.01) | |
| A23J 3/08 | (2006.01) | |
| A23J 3/10 | (2006.01) | |
| A23J 3/16 | (2006.01) | |
| A23L 29/256 | (2016.01) | |
| A23L 29/269 | (2016.01) | |
| A23L 29/275 | (2016.01) | |
| A23L 29/281 | (2016.01) | |
| A23P 10/35 | (2016.01) | |

(52) U.S. Cl.
CPC ................ *A23J 3/227* (2013.01); *A23J 3/08* (2013.01); *A23J 3/10* (2013.01); *A23J 3/16* (2013.01); *A23L 29/256* (2016.08); *A23L 29/274* (2016.08); *A23L 29/275* (2016.08); *A23L 29/284* (2016.08); *A23P 10/35* (2016.08)

(58) Field of Classification Search
None
See application file for complete search history.

(56) References Cited

U.S. PATENT DOCUMENTS

| | | |
|---|---|---|
| 2,336,743 A | 12/1943 | Manning |
| 2,609,566 A | 9/1952 | Slayter et al. |
| 3,245,112 A | 4/1966 | Williamson |
| 3,388,194 A | 6/1968 | Vinicki |
| 3,428,724 A | 2/1969 | Billheimer |
| 3,529,934 A | 9/1970 | Shindo |
| 3,551,557 A | 12/1970 | Garcia |
| 3,920,362 A | 11/1975 | Bradt |
| 4,043,331 A | 8/1977 | Martin et al. |
| 4,070,446 A | 1/1978 | Horikiri et al. |
| 4,113,666 A | 9/1978 | Sano et al. |
| 4,323,524 A | 4/1982 | Snowden |
| 4,323,525 A | 4/1982 | Bornat |
| 4,374,074 A | 2/1983 | Ueda et al. |
| 4,526,525 A | 7/1985 | Oiso et al. |
| 4,790,736 A | 12/1988 | Keuchel |
| 4,793,782 A | 12/1988 | Sullivan |
| 4,872,821 A | 10/1989 | Weiss |
| 5,066,430 A | 11/1991 | Matthews |
| 5,165,940 A | 11/1992 | Windley |
| 5,242,633 A | 9/1993 | Rook et al. |
| 5,326,241 A | 7/1994 | Rook et al. |
| 5,344,297 A | 9/1994 | Hills |
| 5,419,794 A | 5/1995 | Hauber et al. |
| 5,441,754 A | 8/1995 | Evans, Sr. |
| 5,447,423 A | 9/1995 | Fuisz et al. |
| 5,458,823 A | 10/1995 | Perkins et al. |
| 5,460,498 A | 10/1995 | Steel et al. |
| 5,480,598 A | 1/1996 | Gentile et al. |
| 5,556,589 A | 9/1996 | Sibal |
| 5,582,841 A | 12/1996 | Watton et al. |
| 5,622,671 A | 4/1997 | Pellegrin et al. |
| 5,667,814 A | 9/1997 | Shah |
| 5,698,146 A | 12/1997 | Schippers et al. |
| 5,718,716 A | 2/1998 | Goddard et al. |

(Continued)

FOREIGN PATENT DOCUMENTS

| | | |
|---|---|---|
| CN | 1472373 | 2/2004 |
| CN | 101709534 A | 5/2010 |
| CN | 101805942 | 8/2010 |
| CN | 101922060 | 12/2010 |

(Continued)

OTHER PUBLICATIONS

International Search Report and Written Opinion for International Application No. PCT/US2022/018552, date mailed May 18, 2022, 7 pgs.

(Continued)

*Primary Examiner* — Jyoti Chawla

(74) *Attorney, Agent, or Firm* — KOWERT, HOOD, MUNYON, RANKIN & GOETZEL, P.C.; Gareth M. Sampson

(57) ABSTRACT

Methods for producing a meat substitute with plant-based fat contents are disclosed. The methods include the use of protein and/or polysaccharide polymer with fibrillar properties in combination with protein sources of essential amino acids such as plant-based protein. These polymers may be mixed together and then combined with an oil phase emulsion to produce a precursor emulsion. The precursor emulsion may then be processed into three-dimensional fiber structures that include muscle-like fibers with fat encapsulation of the proteins. A contemplated method for forming the fibers includes centrifugally spinning the precursor emulsion to form the fibers.

20 Claims, 5 Drawing Sheets

(56) References Cited

U.S. PATENT DOCUMENTS

| | | |
|---|---|---|
| 5,785,996 A | 7/1998 | Snyder |
| 5,911,942 A | 6/1999 | Fofonoff et al. |
| 5,939,120 A | 8/1999 | Bogue et al. |
| 5,948,334 A | 9/1999 | Takeuchi et al. |
| 5,972,497 A | 10/1999 | Hirwe et al. |
| 5,985,193 A | 11/1999 | Harrington et al. |
| 6,110,590 A | 8/2000 | Zarkoob et al. |
| 6,159,597 A | 12/2000 | Meerman et al. |
| 6,216,430 B1 | 4/2001 | Oppermann |
| 6,221,487 B1 | 4/2001 | Luo et al. |
| 6,235,392 B1 | 5/2001 | Luo et al. |
| 6,382,526 B1 | 5/2002 | Reneker et al. |
| 6,511,930 B1 | 1/2003 | Luo et al. |
| 6,524,514 B1 | 2/2003 | Volokitin et al. |
| 6,548,166 B2 | 4/2003 | Figuly et al. |
| 6,596,033 B1 | 7/2003 | Luo et al. |
| 6,682,677 B2 | 1/2004 | Lobovsky et al. |
| 6,713,011 B2 | 3/2004 | Chu et al. |
| 6,753,454 B1 | 6/2004 | Smith et al. |
| 6,783,708 B2 | 8/2004 | Konishi |
| 6,787,090 B2 | 9/2004 | Dalton et al. |
| 6,843,902 B1 | 1/2005 | Penner et al. |
| 6,852,410 B2 | 2/2005 | Veedu et al. |
| 6,858,168 B1 | 2/2005 | Vollrath et al. |
| 6,872,311 B2 | 3/2005 | Koslow |
| 6,904,745 B2 | 6/2005 | Badiali et al. |
| 7,018,188 B2 | 3/2006 | James et al. |
| 7,032,664 B2 | 4/2006 | Lord et al. |
| 7,036,592 B2 | 5/2006 | Nguyen et al. |
| 7,056,455 B2 | 6/2006 | Matyjaszewski et al. |
| 7,056,849 B2 | 6/2006 | Wan et al. |
| 7,067,444 B2 | 6/2006 | Luo et al. |
| 7,118,698 B2 | 10/2006 | Armantrout et al. |
| 7,127,294 B1 | 10/2006 | Wang et al. |
| 7,134,857 B2 | 11/2006 | Andrady et al. |
| 7,146,792 B2 | 12/2006 | Badiali et al. |
| 7,169,374 B2 | 1/2007 | Siochi et al. |
| 7,186,474 B2 | 3/2007 | Jang |
| 7,208,546 B2 | 4/2007 | Rajagopalan et al. |
| 7,288,306 B2 | 10/2007 | Kersey |
| 7,316,723 B2 | 1/2008 | Chung et al. |
| 7,332,050 B2 | 2/2008 | Kim |
| 7,655,175 B2 | 2/2010 | Michael et al. |
| 7,666,343 B2 | 2/2010 | Johnson et al. |
| 7,691,168 B2 | 4/2010 | Fox et al. |
| 7,763,228 B2 | 7/2010 | Oya et al. |
| 7,857,608 B2 | 12/2010 | Fabbricante et al. |
| 7,901,195 B2 | 3/2011 | Fabbricante et al. |
| 8,110,136 B2 | 2/2012 | Takahashi et al. |
| 8,163,227 B2 | 4/2012 | Sumida et al. |
| 8,231,378 B2 | 7/2012 | Lozano et al. |
| 8,277,711 B2 | 10/2012 | Huang et al. |
| 8,721,319 B2 | 5/2014 | Lozano et al. |
| 8,828,294 B2 | 9/2014 | Lozano et al. |
| 9,228,276 B2 | 1/2016 | Barton et al. |
| 9,988,271 B2 | 6/2018 | Lozano et al. |
| 10,087,554 B2 | 10/2018 | Lozano et al. |
| 10,422,054 B2 | 9/2019 | Lozano et al. |
| 2001/0003148 A1 | 6/2001 | Coffee |
| 2001/0033037 A1 | 10/2001 | Nitschke et al. |
| 2002/0035354 A1 | 3/2002 | Mirle et al. |
| 2002/0106509 A1 | 8/2002 | Figuly et al. |
| 2004/0076661 A1 | 4/2004 | Chu et al. |
| 2004/0096533 A1 | 5/2004 | Dubson et al. |
| 2004/0241216 A1 | 12/2004 | Klun et al. |
| 2005/0054830 A1 | 3/2005 | Islam et al. |
| 2005/0081506 A1 | 4/2005 | Badiali et al. |
| 2005/0136253 A1 | 6/2005 | Michael et al. |
| 2005/0163955 A1 | 7/2005 | Schaefer et al. |
| 2006/0024399 A1 | 2/2006 | Chang et al. |
| 2006/0048355 A1 | 3/2006 | Kim |
| 2006/0049542 A1 | 3/2006 | Chu et al. |
| 2006/0091582 A1 | 5/2006 | James et al. |
| 2006/0228435 A1 | 10/2006 | Andrady et al. |
| 2007/0023958 A1 | 2/2007 | LaVietes et al. |
| 2007/0057414 A1 | 3/2007 | Hartge |
| 2007/0184079 A1 | 8/2007 | Gabbay |
| 2008/0023888 A1 | 1/2008 | Brang et al. |
| 2008/0029617 A1 | 2/2008 | Marshall et al. |
| 2008/0050304 A1 | 2/2008 | Oya et al. |
| 2008/0113214 A1 | 5/2008 | Davis |
| 2008/0136054 A1 | 6/2008 | Fabbricante et al. |
| 2008/0211121 A1 | 9/2008 | Lai et al. |
| 2008/0242171 A1 | 10/2008 | Huang et al. |
| 2009/0020921 A1 | 1/2009 | Cakmak et al. |
| 2009/0042475 A1 | 2/2009 | Pourdeyhimi |
| 2009/0102100 A1 | 4/2009 | Hellring et al. |
| 2009/0142581 A1 | 6/2009 | Heintz et al. |
| 2009/0155326 A1 | 6/2009 | Mack et al. |
| 2009/0160099 A1 | 6/2009 | Huang |
| 2009/0162468 A1 | 6/2009 | Barinov et al. |
| 2009/0232920 A1 | 9/2009 | Lozano et al. |
| 2009/0269429 A1 | 10/2009 | Lozano et al. |
| 2009/0280207 A1 | 11/2009 | Lozano et al. |
| 2009/0280325 A1 | 11/2009 | Lozano et al. |
| 2010/0168808 A1 | 7/2010 | Citron |
| 2010/0233115 A1 | 9/2010 | Patel et al. |
| 2011/0147301 A1 | 6/2011 | Johnson et al. |
| 2011/0156319 A1 | 6/2011 | Kurokawa et al. |
| 2012/0077406 A1 | 3/2012 | Scrivens et al. |
| 2012/0082711 A1 | 4/2012 | Goranov |
| 2012/0135448 A1 | 5/2012 | Parker et al. |
| 2012/0292795 A1 | 11/2012 | Peno |
| 2012/0292796 A1 | 11/2012 | Peno |
| 2012/0292810 A1 | 11/2012 | Peno |
| 2012/0294966 A1 | 11/2012 | Peno |
| 2012/0295021 A1 | 11/2012 | Peno |
| 2012/0304613 A1 | 12/2012 | Peno |
| 2013/0149367 A1 | 6/2013 | Messier et al. |
| 2013/0214442 A1 | 8/2013 | Naskar |
| 2013/0299748 A1 | 11/2013 | Kazaryan et al. |
| 2014/0005470 A1 | 1/2014 | Soletti et al. |
| 2014/0025179 A1 | 1/2014 | Fortini et al. |
| 2014/0159263 A1 | 6/2014 | Lozano et al. |
| 2015/0184317 A1 | 7/2015 | Lozano et al. |
| 2015/0354094 A1 | 12/2015 | Parker et al. |
| 2015/0374878 A1 | 12/2015 | Carter et al. |
| 2016/0015098 A1 | 1/2016 | Conlon |
| 2016/0053172 A1 | 2/2016 | Mori |
| 2020/0240059 A1 | 7/2020 | Baharlou et al. |

FOREIGN PATENT DOCUMENTS

| | | |
|---|---|---|
| CN | 102094254 | 6/2011 |
| CN | 209584428 | 3/2019 |
| DE | 19621231 | 7/1997 |
| EP | 0 003 908 | 9/1979 |
| EP | 0 306 033 | 3/1989 |
| EP | 0 472 067 | 2/1992 |
| EP | 0 709 035 | 5/1996 |
| EP | 1 673 493 | 7/2009 |
| JP | 06287355 | 10/1994 |
| JP | 2001073222 | 3/2001 |
| JP | 2009270221 | 11/2009 |
| KR | 20040052685 | 6/2004 |
| WO | 03/042436 | 5/2003 |
| WO | 2004/056716 | 7/2004 |
| WO | 2005024101 | 3/2005 |
| WO | 2005/042813 | 5/2005 |
| WO | 2009/079523 | 6/2006 |
| WO | 2008/077349 | 7/2008 |
| WO | 2008/121338 | 10/2008 |
| WO | 2010/132636 | 11/2010 |
| WO | 2012/068402 | 5/2012 |

OTHER PUBLICATIONS

Aquilano et al. "{1 0 0} and {1 1 1} forms of the NaCl crystals coexisting in growth from pure aqueous solution" Journal of Crystal Growth (2009) 311(2):399-403.

Assouline et al. "Nucleation ability of multiwalled carbon nanotubes in polypropylene composites" Journal of Polymer Science Part B: Polymer Physics (2003) 41(5), 520-527.

(56) References Cited

OTHER PUBLICATIONS

Badrossamay et al. "Nanofiber Assembly by Rotary Jet-Spinning" Nano Lett. 2010, 10, 2257-2261.
Baji et al "Electrospinning of polymer nanofibers: effects on oriented morphology, structures and tensile properties" Composites Science and Technology (2010) 70(5), 703-718.
Champion et al. "Making Micro- and Nanoparticles of Complex Shapes" PNAS, 2007, 104:11901-11904.
Cho et al. "Structural properties and superhydrophobicity of electrospun polypropylene fibers from solution and melt", Polymer (2010), 51(25), 6005-6012.
"Cotton Candy Express" Available at http://cottoncandyexpress.com/resimachine, Jun. 8, 2009.
Cui et al. "Facile synthesis of core/shell-structured Sn/onion-like carbon nanocapsules as high-performance anode material for lithium-ion batteries" Materials Letters (2015) 143: p. 35-37.
Dabirian et al. "A comparative study of jet formation and nanofiber alignment in electrospinning and electrocentrifugal spinning systems" Journal of Electrostatics (2011) 69(6): p. 540-546.
Dauner "Centrifuge Spinning—an Economic Alternative to Electrospinning" Nano-Cluster Bodensee, NanoEurope 2006, Sep. 14, 2006.
Foster et al. "Centrifugally Spun Polyhydroxybutyrate Fibres: Accelerated Hydrolytic Degredation Studies" Polymer Degradation and Stability, 2005, 87(1), 1-10. (Abstract).
Greensfelder "Nanofibers Created in Orderly Fashion" UC Berkeley Press Release, Jun. 1, 2009.
Ji et al. "Recent developments in nanostructured anode materials for rechargeable lithium-ion batteries" Energy & Environmental Science (2011) 4(8): p. 2682-2699.
Jiang et al. "Centrifugally-spun tin-containing carbon nanofibers as anode material for lithium-ion batteries" Journal of Materials Science (2015) 50(3): p. 1094-1102.
Kamal et al. "Synthesis and catalytic properties of silver nanoparticles supported on porous cellulose acetate sheets and wet-spun fibers." Carbohydrate Polymers (2017) 157, 294-302.
Koczkur et al. "Polyvinylpyrrolidone (PVP) in nanoparticle synthesis" Dalton Transactions (2015) 44:41, 17883-17905.
Lee et al. "Influence of a mixing solvent with tetrahydrofuran and N, N-dimethylformamide on electrospun poly (vinylchloride) nonwoven mats" Journal of Polymer Science Part B: Polymer Physics (2002), 40(19), 2259-2268.
Li et al. "Carbon encapsulated ultrasmall SnO2 nanoparticles anchoring on graphene/TiO2 nanoscrolls for lithium storage" Electrochimica Acta (2014) 147(0): p. 40-46.
"Liu et al. ""Preparation of Nanocrystalline Titanium Dioxide Fibers Using Sol-gel Method and Centrifugal Spinning"" J Sol-Gel Sci Technol (2013) 65:443-451."
Mellado et al. "A simple model for nanofiber formation by rotary jet-spinning" Applied Physics Letters (2011) 99, 203107.
"Nonwovens Interactive", Jun. 8, 2009.
Patel et al. "Novel Preparation Method of Silicon Carbide Nanofibers by Use of Polymer Blend and Melt Spinning Techniques" Journal of Ceramic Society of Japan (2004) 112:S901-S903.
Quintero et al. "Rapid Production of Ultralong Amorphous Ceramic Nanofibers by Laser Spinning" App. Physics Let (2007) 90:153109.
Rein et al. "Electrospinning of ultrahigh-molecularweight polyethylene nanofibers", Journal of Polymer Science: Part B: Polymer Physics (2007) 45(7), 766-773.
Rodriguez et al. "Preparation of Electrospun Chitosa-PEO Fibers" Bioengineering Conference, 2006, Proceedings of the IEEE 32nd Annual Northeast, 87-88, Apr. 2006.
Scheffler et al. "Electrospun teflon AF fibers for superhydrophobic membranes" Journal of Materials Research (2010) 25(8), 1595-1600.
Shen et al. "Tin nanoparticle-loaded porous carbon nanofiber composite anodes for high current lithium-ion batteries" Journal of Power Sources (2015) 278: p. 660-667.
Tran et al. "Electrospun SnO2 and TiO2 Composite Nanofibers for Lithium Ion Batteries" Electrochimica Acta (2014) 117(0): p. 68-75.
Tsuji et al. "Rapid transformation from spherical nanoparticles, nanorods, cubes, or bipyramids to triangular prisms of silver with PVP, citrate, and H2O2" Langmuir (2012) 28:24, 8845-8861.
Warner et al. "Cost Effective Nanofiber Formation: Melt Electrospinning" National Textile Center Annual Report, Nov. 2005.
Weitz et al. "Polymer Nanofibers Via Nozzle-Free Centrifugal Spinning" Nano Letters (2008), 8:1187-1191.
Xia et al. "The effects of electrospinning parameters on coaxial Sn/C nanofibers: Morphology and lithium storage performance" Electrochimica Acta (2014) 121(0): p. 345-351.
Zheng et al. "Controlled Crystallization of Sodium Chloride Nanocrystals in Microdroplets Produced by Electrospray from an Ultra-Dilute Solution" European Journal of Inorganic Chemistry (2016), No. 12, 1860-1865.
Zhou et al. "Three-jet electrospinning using a flat spinneret" J. Mater Sci. (2009), 44, 5501-5508.
Zhong et al. "Nanostructued core-shell Sn nanowires @ CNTs with controllable thickness of CNT shells for lithium ion battery" Applied Surface Science (2015) 332: p. 192-197.
"Manufacturing: Synthetic and Cellulosic Fiber Formation Technology" www.fibersource.com/f-tutor/techpag.htm Apr. 7, 2011.
Wang et al. "Controllable fabrication and properties of polypropylene nanofibers" Polymer Engineering and Science (2007) 47(11), 1865-1872.
Fang et al. "Needleless Melt-Electrospinning of Polypropylene Nanofibers" Journal of Nanomaterials, (2012) 1-9.
Watanabe "Effect of organic solvent on morphology and mechanical properties of electrospun syndiotactic polypropylene nanofibers" Polymer Bulletin (2011) 67(9), 2025-2033.
Watanabe et al. "Development of Polypropylene Nanofiber Production System" Polymer Reviews (2011) 51(3), 288-308.
Raghaven et al. "Fabrication of Melt Spun Polypropylene Nanofibers by ForcespinningTM" (2013) Journal of Engineered Fibers and Fabrics vol. 8, Issue 1, Mar. 2013.
Ondarcuhu et al. "Drawing a single nanofibre over hundreds of microns", Europhysics Letters (1998), 42(2), 215-220.
Feng et al. "Super-hydrophobic surface of aligned polyacrylonitrile nanofibers" Angewandte Chemie (International ed. in English) (2002), 41(7), 1221-3.
Martin "Membrane—Based Synthesis of Nanomaterials", Chemistry of Materials (1996) 8(8), 1739-1746.
Ma et al. "Synthetic nano-scale fibrous extracellular matrix", Journal of Biomedical Materials Research (1999) 46(1), 60-72.
Liu et al."Polystyrene-block-poly (2-cinnamoylethyl methacrylate) nanofibers—preparation, characterization, and liquid crystalline properties" Chemistry—A European Journal (1999), 5(9), 2740-2749.
Whitesides et al."Self-assembly at all scales", Science (New York, N.Y.) (2002), 295(5564), 2418-21.
Deitzel et al. "Controlled deposition of electrospun poly (ethylene oxide) fibers", Polymer, (2001) 42(19), 8163-8170.
Doshi et al. "Electrospinning process and applications of electrospun fibers" Journal of Electrostatics (1995), 35(2&3), 51-60.
Subbiah et al. "Electrospinning of nanofibers" Journal of Applied Polymer Science (2005) 96(2), 557-569.
Ellison et al. "Melt blown nanofibers: Fiber diameter distributions and onset of fiber breakup" Polymer (2007) 48(11), 3306-3316.
Theron et al. "Multiple jets in electrospinning: experiment and modeling", Polymer (2005), 46(9), 2889-2899.
Tomaszewski et al. "Investigation of electrospinning with the use of a multi-jet electrospinning head" Fibres & Textiles in Eastern Europe (2005) 13(4), 22-26.
Han et al. "Superhydrophobic and oleophobic fibers by coaxial electrospinning" Langmuir (2009), 25(16), 9454-9462.
Xiong et al."Fabrication of ultrafine fibrous polytetrafluoroethylene porous membrane by electrospinning" Journal of Materials Research (2009), 24(9), 2755-2761.
Wang et al. "Solution-electrospun isotactic polypropylene fibers: processing and microstructure development during stepwise annealing" Macromolecules (2010), 43(21), 9022-9029.
Tan et al."Meltblown fibers: Influence of viscosity and elasticity on diameter distribution" J. Non-Newtonian Fluids Mechanics (2010), 165(15-16), 892-900.

(56) References Cited

OTHER PUBLICATIONS

Rangkupan et al. "Electrospinning process of molten polypropylene in vacuum" Journal of Metals, Materials and Minerals (2003) 12(2), 81-87.
Lyons et al. "Meltelectrospinning part I: processing parameters and geometric properties" Polymer (2004) 45, 7597-7603.
Zhmayev et al. "Nanofibers from gas-assisted polymer melt electrospinning", Polymer (2010), 51(18), 4140-4144.
Garbarczyk et al. "Polymorphism of isotactic polypropylene in presence of additives, in blends and in composites" Journal of Macromolecular Science, Part B—Physics (2002), 41 (4-6), 1267-1278.
Meille et al. "Structure of β-isotactic polypropylene: a long-standing structural puzzle" Macromolecules (1994) 27 (9), 2615-2622.
Dorset et al. "Isotactic polypropylene, β-phase: a study in frustration" Polymer (1998), 39(25), 6331-6337.
Reneker et al. "Nanofiber garlands of polycarpolactone by electrospinning" Polymer (2002) 43(25), 6785-6794.
Li et al. "Green and facile synthesis of fibrous Ag/cotton composites and their catalytic properties for 4-nitrophenol reduction." Applied Surface Science (2017) 426, 160-168.
Teo et al. "A Review on Electrospinning Design and Nanofiber Assemblies" Nanotechnology, (2006) 17:R89-R106.
International Search Report and Written Opinion for International Application No. PCT/IB2018/056854, date mailed Jan. 17, 2019.
M. Noruzi, Electrospun nanofibres in agriculture and the food industry: a review, J. Sci. Food Agric. 96 (2016) 4663-4678. https://doi.org/10.1002/jsfa.7737.
B. Ghorani, N. Tucker, Fundamentals of electrospinning as a novel delivery vehicle for bioactive compounds in food nanotechnology, Food Hydrocoll. 51 (2015) 227-240. https://doi.org/10.1016/j.foodhyd.2015.05.024.
M. Nieuwland, P. Geerdink, P. Brier, P. Van Den Eijnden, J.T.M.M. Henket, M.L.P. Langelaan, N. Stroeks, H.C. Van Deventer, A.H. Martin, Reprint of "food-grade electrospinning of proteins," Innov. Food Sci. Emerg. Technol. 24 (2014) 138-144. https://doi.org/10.1016/j.ifset.2014.07.006.
Y. Dror, T. Ziv, V. Makarov, H. Wolf, A. Admon, E. Zussman, Nanofibers made of globular proteins, Biomacromolecules. 9 (2008) 2749-2754. https://doi.org/10.1021/bm8005243.
T. Senthil Muthu Kumar, K. Senthil Kumar, N. Rajini, S. Siengchin, N. Ayrilmis, A. Varada Rajulu, A comprehensive review of electrospun nanofibers: Food and packaging perspective, Compos. Part B Eng. 175 (2019) 107074. https://doi.org/10.1016/j.compositesb.2019.107074.
K.D. Mattice, A.G. Marangoni, Comparing methods to produce fibrous material from zein, Food Res. Int. 128 (2020) 108804. https://doi.org/10.1016/j.foodres.2019.108804.
M.L.R. Carlsson, S. Kanagarajan, L. Bülow, L.H. Zhu, Plant based production of myoglobin—a novel source of the muscle heme-protein, Sci. Rep. 10 (2020) 1-10. https://doi.org/10.1038/s41598-020-57565-y.
C.P. Barnes, M.J. Smith, G.L. Bowlin, S.A. Sell, T. Tang, J.A. Matthews, D.G. Simpson, J.C. Nimtz, Feasibility of Electrospinning the Globular Proteins Hemoglobin and Myoglobin, J. Eng. Fiber. Fabr. 1 (2006) 155892500600100. https://doi.org/10.1177/155892500600100202.
A. Kishimura, A. Koide, K. Osada, Y. Yamasaki, K. Kataoka, Encapsulation of myoglobin in PEGylated polyion complex vesicles made from a pair of oppositely charged block ionomers: A physiologically available oxygen carrier, Angew. Chemie—Int. Ed. 46 (2007) 6085-6088. https://doi.org/10.1002/anie.200701776.
Ajalloueian et al., "Emulsion electrospinning as an approach to fabricate PLGS/Chitosan Nanofibers for Biomedical applications" https://pubmed.ncbi.nlm.nih.gov/24689041/, 13 pgs.
Nooshin Nikmaram et al, Royal Society of Chemistry "Emulsion-based systems for fabrication of electrospun nanofibers: food, pharmaceutical and biomedical applications", https://pubs.rsc.org/en/content/articlehtml/2017/ra/c7ra00179g, 14 pgs.
G.T.V. Prabu et al, Scientific Reports natureresearch, "A Novel Profled Multi-Pin Electrospinning System for Nanofber Production and Encapsulation of Nanoparticles into Nanofbers" https://www.nature.com/articles/s41598-020-60752-6.pdf, 11 pgs.
European Extended Search Report and European Search Opinion issued in EP18854957.0 mailed Apr. 12, 2021.
Global Dossier Translation of JP06287355, https://globaldossier.uspto.gov/#/details/JP/7681293/A/129652, printed Feb. 23, 2023. (Year: 2023).
International Search Report and Written Opinion for International Application No. PCT/US2020/018725, issued May 11, 2020.
International Preliminary Report on Patentability for International Application No. PCT/US2022/018552, mailed Sep. 14, 2023.

NANOFIBER SYSTEMS AS MEAT SUBSTITUTE

PRIORITY CLAIM

This application claims benefit of priority to U.S. Provisional Application Ser. No. 63/356,309, entitled "NANOFIBER SYSTEMS AS MEAT SUBSTITUTE," filed Jun. 28, 2022 and to U.S. Provisional Application Ser. No. 63/376,314, entitled "NANOFIBER SYSTEMS AS MEAT SUBSTITUTE," filed Sep. 20, 2022, both of which are incorporated herein by reference in their entirety.

STATEMENT REGARDING FEDERALLY SPONSORED RESEARCH OR DEVELOPMENT

This invention was made with government support under Grant No. DMR 2122178 awarded by the National Science Foundation. The government has certain rights in the invention.

1. TECHNICAL FIELD

The disclosed embodiments generally relate to the field of fiber structures. Specific embodiments relate to the production of three-dimensional fiber structures that confine bioactive materials in the fiber layers of the structures.

DESCRIPTION OF THE RELATED ART

Since 1800, the world population has grown sevenfold, and the global economy has grown 30-fold. This means, in the last 50 years the economy has driven a phenomenal increase in the demand for energy, land, and water. This phenomenon is known as the Great Acceleration. The health, knowledge, and standard-of-living improvements have risen at a huge cost to the stability of the natural systems. Our impact has now reached a scale at which it interferes profoundly with Earth's atmosphere, ice sheets, ocean, forests, land, and biodiversity. The latest results from the National Footprint Accounts indicate that population are currently using nature 1.7 times faster than the planet's ecosystems can regenerate. According to a recent Living Planet Report and the IPBES (Intergovernmental Science-Policy Platform on Biodiversity and Ecosystem Services) report, the main drivers of the decline of biodiversity continue to be the overexploitation of species, agriculture, and land conversion—all driven by considerably large human consumption.

On the other hand, the accelerated growth of population has dramatically increased meat consumption. The way that meat is traditionally produced, by farming animals, is environmentally unsustainable. This practice is exerting pressure on our resources such as land and water, contributing to the loss of biodiversity and to greenhouse gas emissions. A recent United Nations report calls on people to substantially cut down on meat consumption to help save the planet. Thinking in generating solutions to this problem, some alternatives have been produced such as synthetic meat from animal and plant sources.

Cultured meat, also called "lab growth meat" and "clean meat", involves growing meat from real animal cells, specifically muscle cells or stem cells, in a process known as cell-based agriculture. The future vision is to grow clean meat products, such as chicken, beef, pork, or fish, commercially at a large-scale in factories. However, there are still some disadvantages that need to be overcome before starting to enjoy the environmental benefits that cultured meat represents. At present, one of the biggest factors preventing widespread adoption is cost. In 2013, it cost the Netherlands-based Mosa Meats around $1.2M to make a pound of lab meat. Nowadays, the cost of production has lowered to just $30 per pound; however, there is still a long way to go before clean meats can be feasibly sold in stores. Additionally, further research is needed to dissipate uncertainties over various potential safety issues. For example the safety for ingesting rapidly growing genetically-modified cell lines, as these lines exhibit the characteristic of cancerous cells. Another major issue associated with processing methods using cell lines and/or culture medium is contamination. Unlike animals, cells do not have a fully functioning immune system, therefore there is a high likelihood of bacterial or fungal growth, mycoplasma, and other human pathogens growing in vas of cells. These are some of the concerns that need to be cleared to consider cultured meat a safety product for the human consumption.

Another commercially available option is synthetic meat produced by plant sources. The main nutritional value of the proteins is related to their essential amino acids content. Protein derived from plant sources have different amino acids profiles and health benefits. The ideal combination of proteins derived from different plant sources can supply an amount of essential amino acid for human health requirements. The nutritional versatility found in plant-based proteins has produced a great interest in the food and processing industry. Textured vegetable proteins (TVP) have emerged as a low-cost alternative to the ground meat, without sacrificing the nutritional value. Extrusion is the technology used for the production of TVP, resulting in products that have an appearance and texture similar to the fibrillar structure of meat. Meat extenders are made from defatted soy flour, soy protein concentrate, legume proteins including common beans and peas, or wheat proteins, extruded at low moisture (20-35%) or high moisture contents (50-70%). In the extraction process some soybeans enzymes are destroyed, including a urease that reduces the shelf-life, a lipoxidase that causes undesirable flavors by oxidation of soya oil, and also a trypsin inhibitor that reduces protein digestibility. In the process, the pH is adjusted in order to get different final product textures. For example, at a lower pH (5.5) the chewiness increases, whereas at a higher pH (8.5) a tender product with higher rehydration is produced. Additives for getting colors, flavors, textures are added. The material is plasticized in an extruder at 60-104° C., extruded into expanded texturized strands, and finally cooled and dried to 6-8% moisture content. Although extrusion is relatively energy intensive, it is the most widely applied technology for the production of meat analogues.

Two companies known to use textured vegetable protein as the main ingredient to produce meat substitutes are Impossible Foods (IF) and Beyond Meat (BM). These companies combine different ingredients derived from plants to get the taste and texture of meat, even including fat from coconut oil. However, it is known that coconut oil is made mostly by saturated fat (83% is saturated fat) and the reason why there are concerns about the use of this type of oil in "healthy" food. This makes it an attractive idea to try and use healthier oils such as olive oil or avocado oil in plant-based meat alternatives.

Figure 1:
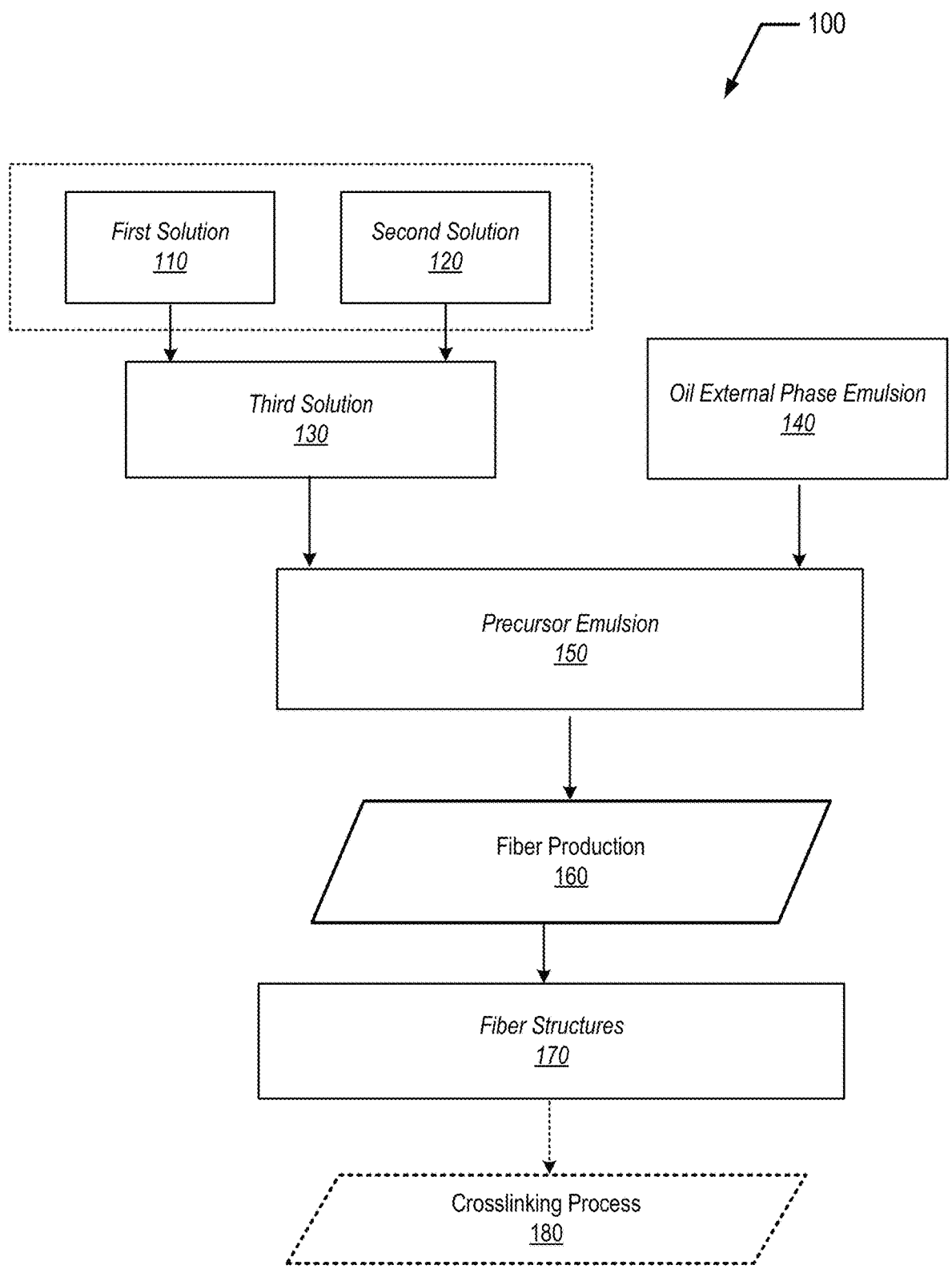
FIG. 1 is a flow diagram illustrating a method for producing muscle-like nanofiber systems, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Nanofiber technology has been used in many industries including the food and packaging industries. A wide range of proteins and carbohydrates can be transformed into nanofibers with structural integrity, and complete biocompatibility. Fibers, through their functional groups, can interact with bioactive compounds, allowing the integration of a range of hydrophilic and hydrophobic bioactive food ingredients. In the food industry, nanofibers have mostly been used to safeguard food from oxidation, moisture, and light through food encapsulation. Studies have been conducted using polysaccharides and proteins for fiber fabrication that could be potentially useful for making functional foods. Proteins are difficult to convert into fibers, mainly because of their intricate secondary and tertiary structures. Proteins should be well dissolved in a random coil conformation to be converted into fibers. However, these requirements are difficult to meet by plant proteins, since plant proteins are globular in their native state and upon denaturation may form insoluble aggregates. Therefore, the feasibility to make fibers and the mechanical properties of the nanofibers obtained from proteins could be controlled by the manipulation of the protein conformation and its aggregation. Usually, a blend of components is required to allow the presence of protein in the final fibrillar structure. For example, zein protein have been spun into nanofibers and have been used as a carrier for other proteins, such as soy protein. Similarly, the formation of fibers from carbohydrate sources mostly depends on the molecular structure. Some of the commonly used proteins useful for material encapsulation include soy protein isolate, whey protein isolate, zein, egg albumen, collagen, gelatin, and casein. Fibers have been produced by several animal-based proteins, such as whey, collagen, egg, and gelatin, but only sparingly for plant proteins.

As described above, fiber properties can be used to mimic the fibers structures of meat. There have been some studies that have focused on the use of polysaccharides and protein blends to produce fibers with different textures with potential applications as meat substitutes. Specifically, zein electrospun fibers were used to mimic the desired texture of meat and produce meat analogs. From these studies, the present inventors recognize the need to design a more complex fiber structure that includes the incorporation of proteins and unsaturated oils (avocado oil, olive oil, etc.) through encapsulation techniques to produce a muscle-like nanofiber system made of plant and/or animal proteins with a healthy fat content.

The present disclosure describes the use of biopolymers based mainly on polysaccharides polymers and plant with/without animal proteins to produce muscle-like nanofibers with a healthy fat content. In various embodiments, edible polysaccharides polymers (such as pullulan, chitosan and alginate, widely used in food preparations) are used as part of the fibrillar structure. The sources of essential amino acids to fulfil human health needs are provided through the proteins (gelatin, sodium caseinate, whey protein, soy protein, zein, etc.). These proteins could be derived from plants or animals, and their integration on the final product depends on their interaction with the precursor medium. Changes in the pH of the medium are applied in order to produce different protein conformations, achieving a significant impact on the textures of the final product. For fat encapsulation, some complex emulsion techniques are applied to ensure stable nanodroplets of oil well distributed into the nanofiber structure. Other additives may be added to enhance the nutritional and sensorial properties. For instance, additives such as essential oils (oregano, rosemary, and sage), myoglobin, crosslinking agents, or buffering agents, among others.

Myoglobin is a heme-protein found in muscle tissue and has been described as an oxygen binding protein, which facilitates diffusion of oxygen to the mitochondria and also has functions in the hemostasis of nitric oxide. The body uses it as an oxygen storage protein in muscle and this is the reason for the red color of the most of the vertebrate's muscle. This protein is an important nutritional source of iron. Iron is an essential micronutrient with a daily requirement between 6 and 8 mg for adults. Iron deficiency, which can lead to anemia, has been a worldwide health concern. The moral, environmental, and economic concerns about meat consumption have motivated the need for alternative products capable of filling its nutritional role. In this context, the possibility has emerged to produce heme-proteins in plants by transient expression using a viral vector delivered by *Agrobacterium tumefaciens*, something important for vegetarians. Recently, another type of heme-protein called leghemoglobin was produced in yeast using recombinant technology. Leghemoglobin is used as an additive to mimic the color and flavor of meat and produced by Impossible Foods, Inc. Additionally, bovine myoglobin has been produced by fermentation using a modified strain of *Pichia pastoris*; technology which belongs to Moti FoodWorks Inc. and is used in meat analogs products.

Myoglobin has been used in fiber production and as an active component/iron source in non-fiber-based products for biomedical and food applications. Hollow capsules or vesicles have been used to encapsulate the myoglobin to be used as the oxygen carrier. The inclusion of myoglobin aqueous medium into the fibrillar structure in an isolated oil phase could help to mimic the liquid content of a piece of steak. Researchers have used physical chemical models to understand the key factors impacting the fluid holding properties of meat analogs. Their focus has been related to the interactions between solvents-biopolymers, gel networking formation, changes in biopolymer type, concentrations, and crosslinking.

The present disclosure implements the usage of a centrifugal spinning process (e.g., Forcespinning® technology) to develop muscle-like nanofiber based systems. The described fiber system is based on a hierarchically design that includes fat (healthy oils) content. In various embodiments, hierarchical nanofiber structures are produced to mimic meat properties. This complex structure contains edible compounds rich in amino acids and polysaccharides. Mixes of proteins and polysaccharides may be integrated in the fibrillar structure with protein domain modulation (PDM) obtained by changes in the medium's pH through the addition of buffering agents. The PDM acts as a morphological determinant in the production of different textures. Healthy oils are encapsulated through complex emulsion process, like multiple or Pickering emulsion, to produce a homogeneous distribution of oil droplets into the fibrillar structure. Myoglobin is used in the fibrillar structure to simulate the meat color and taste, and provide a source of iron. Additionally, to ensure a certain amount of water in the final structure, an aqueous solution of myoglobin is encapsulated into the oil/fat content. In this case, the oil acts as a water protective phase to inhibit water evaporation in the fiber formation process.

FIG. 1 is a flow diagram illustrating a method for producing muscle-like nanofiber systems, according to some embodiments. In various embodiments, method 100 begins with preparing a first solution 110. In certain embodiments, first solution 110 is a combination of spinnable polymer components. For instance, first solution 110 may include polymers or be a mixture of polymers capable of forming a fiber structure. In various embodiments, the polymers are based on polysaccharide polymers and/or proteins such as gelatin, zein, and other proteins are possible. Examples of polymers for first solution 110 include, but are not limited to, alginate (AL), pullulan (PL), chitosan (CH), zein (ZN), and gelatin (GL).

In some embodiments, first solution 110 is a combination of two or more components. For instance, the components may include two or more polymers (e.g., protein-based polymers). In some contemplated embodiments of multiple component mixtures, a first polymer has a weight percentage between about 70% and about 85% with the remainder being the second polymer. In various embodiments, first solution 110 is formed by mixing the combined components at the desired weight ratio with deionized (DI) water as a solvent. In embodiments with chitosan, some citric acid may be added before the addition of chitosan to the solution to provide complete dissolution of chitosan in the DI water solvent. The second component can then be added after dissolving of the chitosan. In embodiments with gelatin, it may be necessary to heat the solution (e.g., to 40-50° C.) in order to get complete dissolution of gelatin. In some embodiments, first solution 110 is left for 24 hours in a constant agitated state at the temperature of dissolution before further processing in method 100.

In various embodiments, method 100 also includes preparation of second solution 120. Second solution 120 may be a protein solution. Examples of proteins for second solution 120 include, but are not limited to, plant-based protein, soy protein, gelatin, egg protein, sodio caseinate, and whey protein. In certain embodiments, the second solution 120 includes plant-based protein (e.g., soy protein) or a mixture of plant-based protein with one of gelatin, egg protein, sodio caseinate, or whey protein. The proteins may be dissolved/dispersed in DI water and the pH may also be adjusted (e.g., using buffering agents) to be either acidic or basic depending on the desired final product. In some embodiments, the second solution 120 is left for 24 hours in a constant agitated state before further processing in method 100.

In certain embodiments, first solution 110 and second solution 120 are combined to produce third solution 130. Third solution 130 may be produced by combining first solution 110 and second solution 120 in a predetermined ratio. The predetermined ratio may be based on a desired final protein product concentration. In some embodiments, first solution 110 and second solution 120 are combined by mixing at a high-speed rate using a vortex and leaving the solution under stirring until further processed.

In certain alternative embodiments, the third solution 130 is produced by a method that directly combines the polymers of the first solution (e.g., polysaccharide polymers) and the proteins of the second solution (e.g., soy protein) within the same system. The materials may be directly combined in a predetermined ratio that is based on a desired final protein product concentration. In some embodiments, the polysaccharide polymers are first dissolved in DI water and then the protein is added using a vortex and an ultrasonic bath for about 10-15 minutes until a homogeneous solution is produced.

Method 100 also includes preparation of oil external phase emulsion 140. Oil external phase emulsion 140 may be an emulsion made of aqueous solution with myoglobin as an internal phase and oil as an external phase. The oil may include, but not be limited to, avocado oil, olive oil, sesame oil, and safflower oil. Preparation of oil external phase emulsion 140 includes preparing the myoglobin solution and then emulsions with different internals phase in oil (e.g., 10%, 20%, 30%, or higher internal phase). For the emulsion preparation, the homogenization time may be between 2 and 4 min under a speed between 4000 and 11000 rpm. These parameters may be varied based on the homogenization mechanism implemented in preparation.

Method 100 then proceeds with forming precursor emulsion 150 from third solution 130 and oil external phase emulsion 140. For precursor emulsion 150, third solution 130 is the external phase and oil external phase emulsion 140 is the internal phase. In various embodiments, preparation of precursor emulsion 150 includes adding oil external phase emulsion 140 to a container (e.g., a vial) and adding third solution 130 based on a predetermined ratio. In some embodiments, the predetermined ratio is 5%-20% by weight of oil external phase emulsion 140. In some embodiments, a surfactant may be added such as, but not limited to, tween 80, sodium casein, or others. After combining third solution 130 and oil external phase emulsion 140 in the predetermined ratio, the mixture may be homogenized at a predetermined speed and time. In some embodiments, the speed is between 4000 and 11000 rpm and the time is between 2 and 5 min, though these parameters can vary. In various embodiments, precursor emulsion 150 is a multiple emulsion. For instance, precursor emulsion 150 may be a multiple emulsion type $W_1/O/W_2$, where the $W_1$ is the myoglobin solution and $W_2$ is third solution 130.

After preparation of precursor emulsion 150, the precursor emulsion may be implemented in fiber production 160 to produce fiber structures 170. In certain embodiments, fiber production 160 includes a centrifugally spinning fiber production system. As one example, fiber production 160 may implement fiber production using a Cyclone L-1000 M centrifugal spinner available from FibeRio Technology Corp. (McAllen, Texas). Such a system includes a cylindrical spinneret with two nozzles equipped with regular beveled needles (e.g., 30-gauge length needles available from Becton, Dickinson and Company (Franklin Lakes, New Jersey)) and collectors in the form of metal bars arranged around the spinneret at a specified distance (e.g., about 15 cm from the nozzles).

Fiber production 160 may include multiple runs using precursor emulsion 150. For example, a run may include adding a specified volume (e.g., 1-2 mL) of precursor emulsion 150 to the spinneret while fiber spinning is carried out using predetermined parameters. Fiber production 160 produces fiber structures 170 from precursor emulsion 150. Fiber structures 170 may be, for example, three-dimensional fiber structures that include muscle-like fibers with fat encapsulation of proteins. In some embodiments, fiber structures 170 may be passed through crosslinking process 180. For instance, a crosslinking agent (e.g., citric acid) may be added as part of a solution used in the process to produce fiber structures 170. The crosslinking agent may then be activated in crosslinking process 180. Crosslinking process 180 may include, for example, heating fiber structures 170 to a temperature between about 110° C. and about 120° C. to activate the crosslinking agent. Crosslinking may be added to improve the stability of fibers structures 170 in water.

Figure 2A:
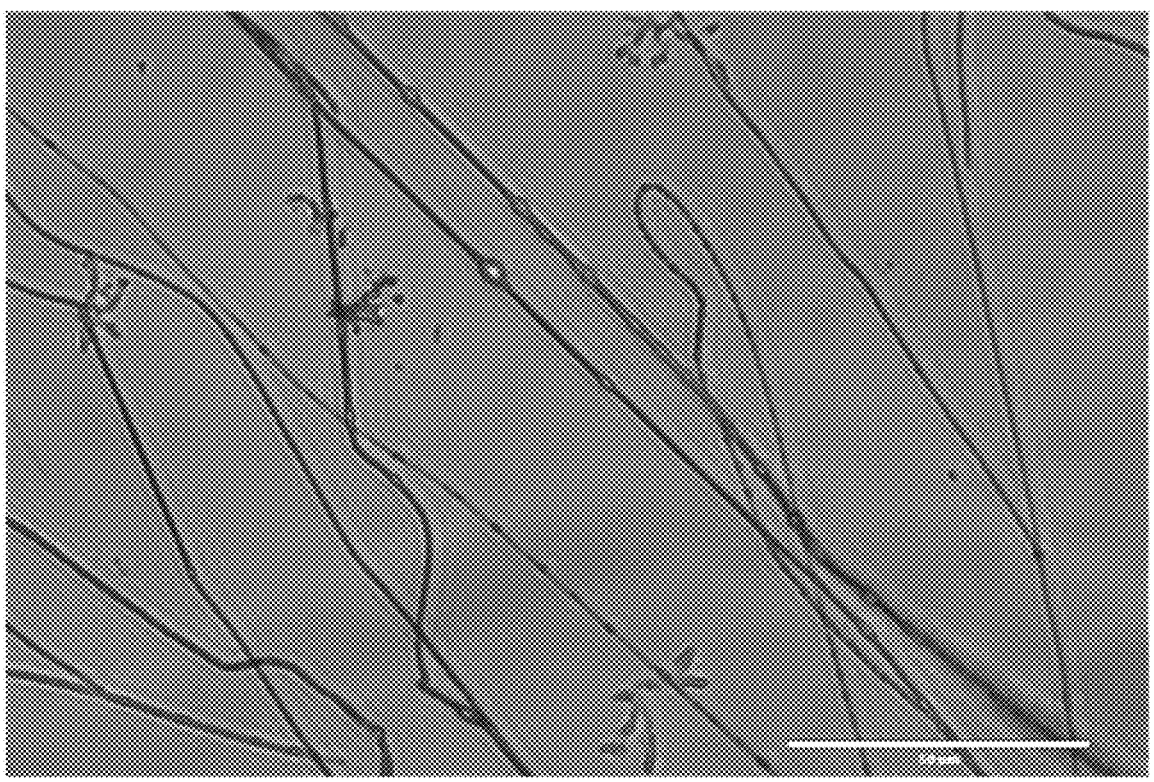
FIGS. 2A-2C are confocal images of muscle-like nanofibers with a healthy fat content.
Figure 2B:
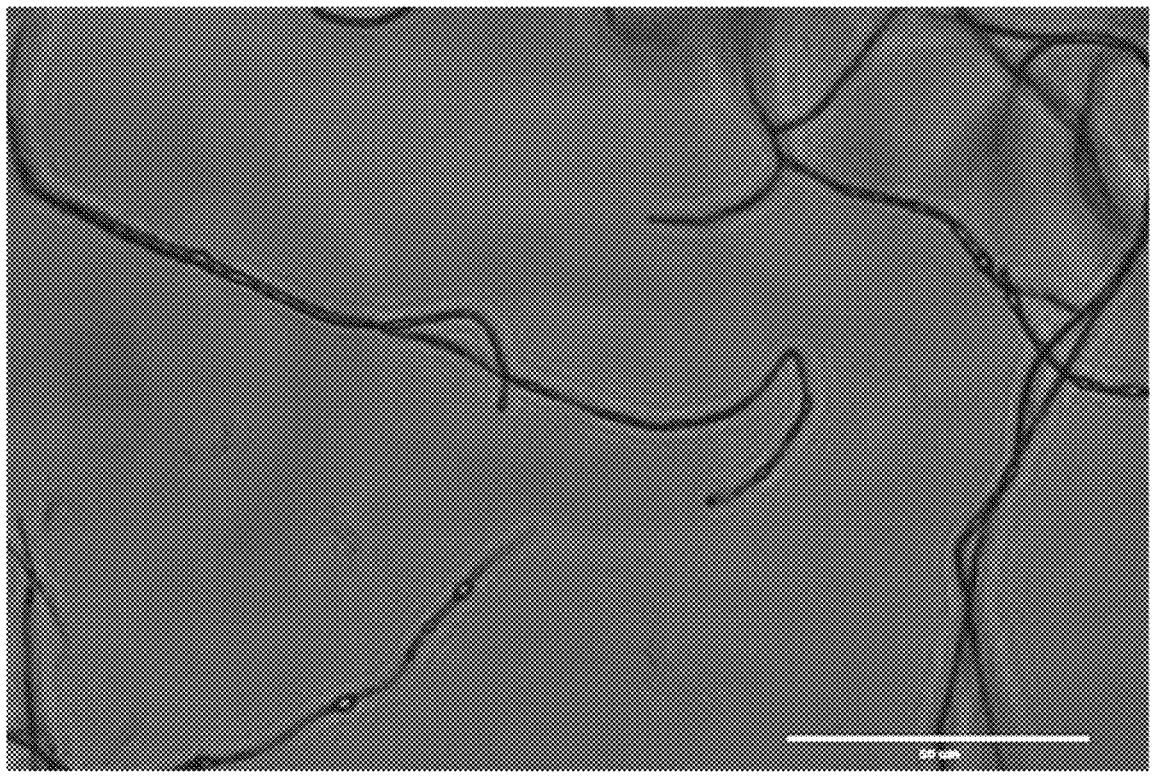
Figure 2C:
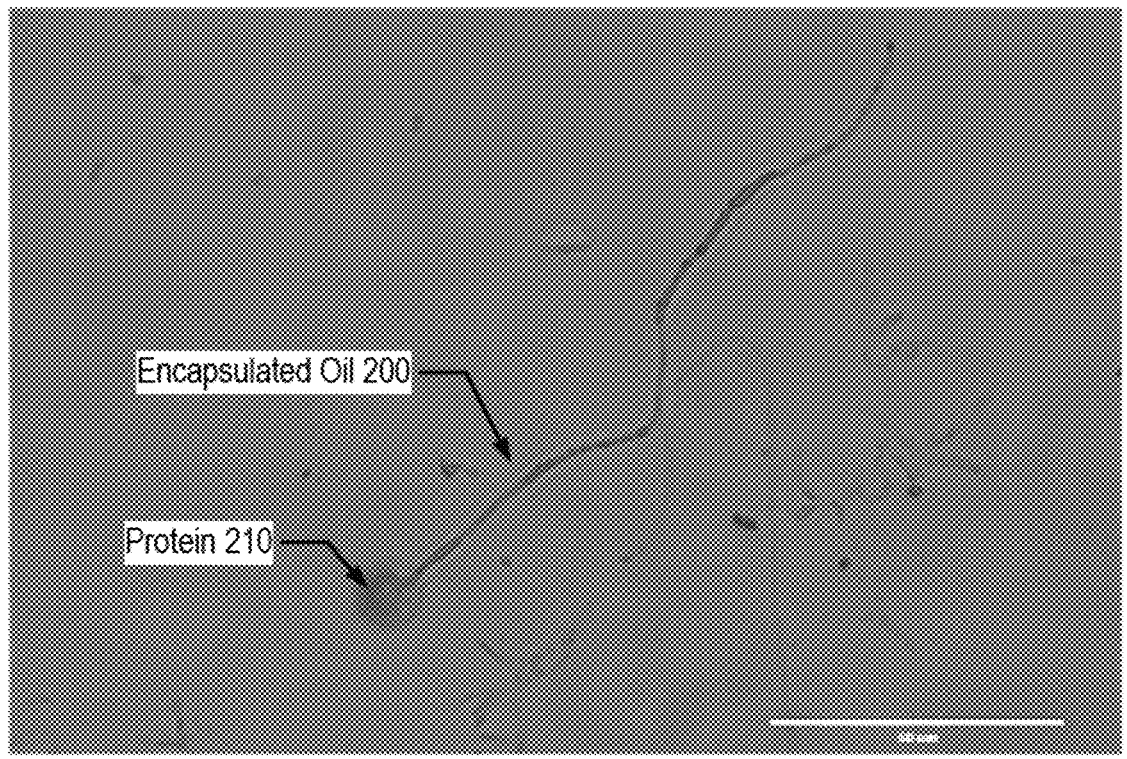
Figure 3:
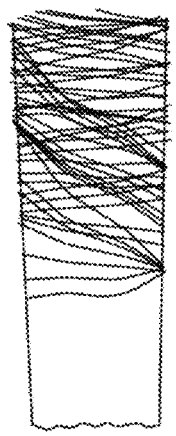
FIG. 3 is an image of example fibers obtained through the disclosed embodiments.
Figure 4A:
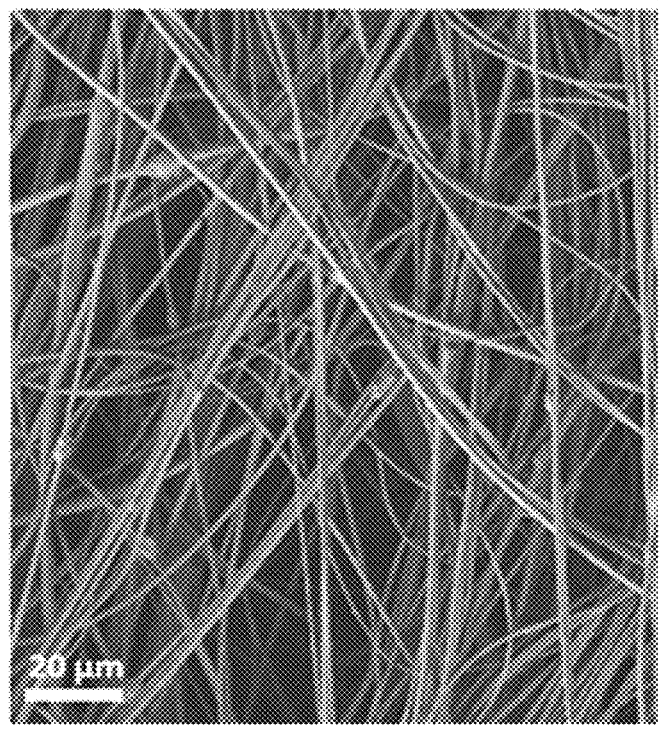
FIGS. 4A and 4B are scanning electron microscope (SEM) images showing locations of encapsulated oils in fiber structures.
Figure 4B:
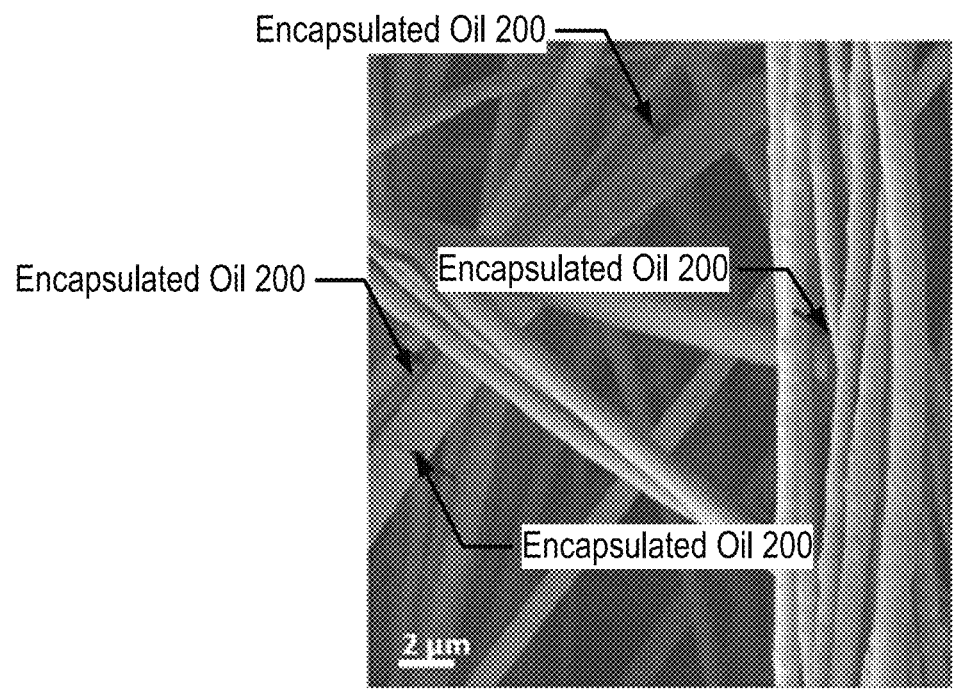
Figure 5A:
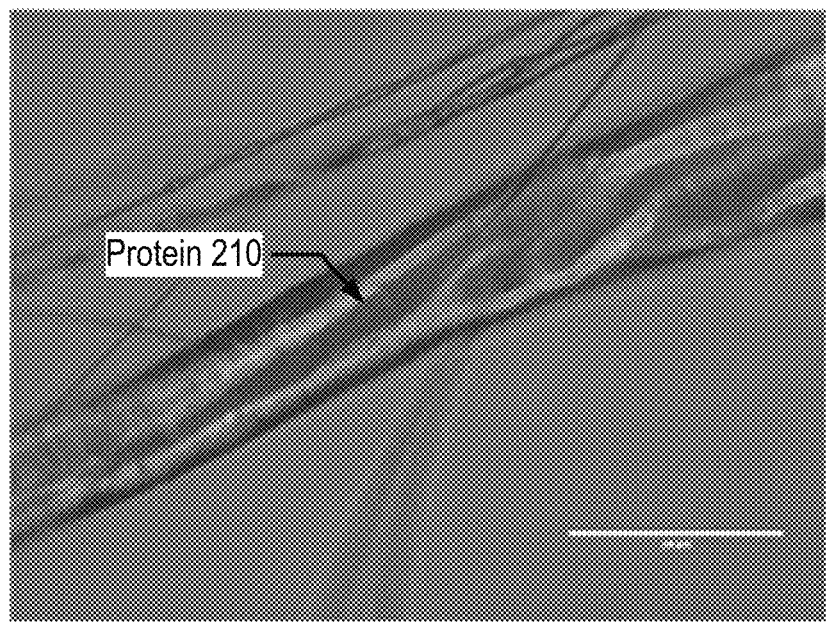
FIGS. 5A and 5B are additional confocal images showing protein locations in fiber structures.
Figure 5B:
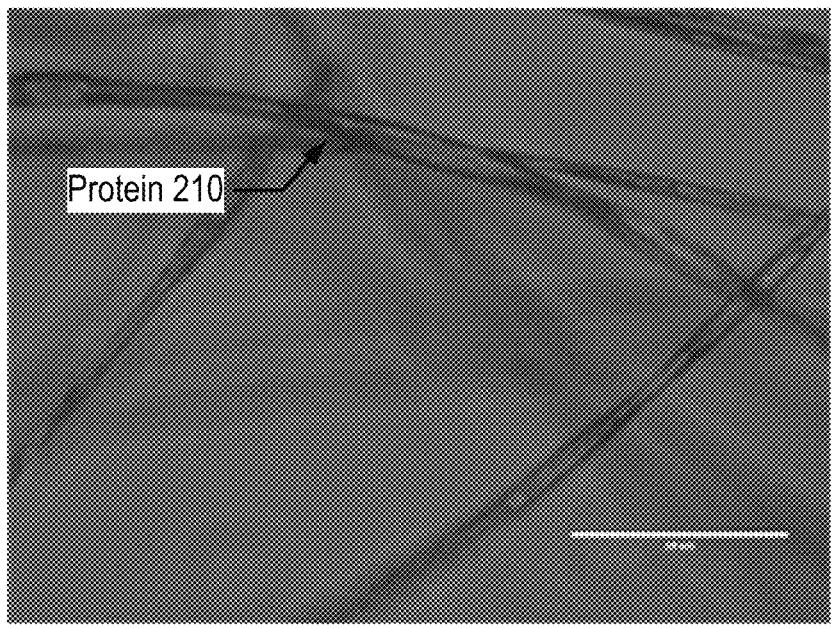

An example of a muscle-like nanofiber system produced according to various embodiments is shown in FIGS. 2A-C, which are confocal images of muscle-like nanofibers with a healthy fat content. FIG. 2C shows encapsulated oil 200 and protein 210. FIG. 3 is a photographic image of example fiber structures obtained by the disclosed embodiment of method 100. FIGS. 4A and 4B are scanning electron microscope (SEM) images showing locations of encapsulated oils in fiber structures. FIGS. 5A and 5B are additional confocal images showing protein locations in fiber structures.

The produced, muscle-like nanofibers systems with fat encapsulation ("produced nanofiber meat system) have the potential to be applied in food industry. As described above, due to the rapid population growth and its huge impact on meat consumption, different alternatives and ideas have been generated to produce synthetic meat. Further, regarding "cultured meat" there are several challenges that need to be overcome before the environmental benefits of this food option can be realized. The challenges include, for example, high cost, safety issues related with the use of rapidly growing genetically-modified cell lines, and the control to dissipate pathogenic microorganisms in the culture medium and its effect in the final product. For proteins derived from plant sources, there are products commercially available in the market and different technologies that have been developed to mimic not just the nutritional value of the meat but also the color, flavor, and texture. These commercially available products have been made with a texture like that of ground meat. There remains, however, motivation and interest in providing meat substitute structures that more accurately mimic the properties of a juicy piece of steak (e.g., whole muscle tissue). The present disclosure describes a structure that provides complex hierarchically designed nanofiber structures that more closely resemble meat's attributes such as color, amino acids/iron source, taste, different textures (e.g., textures modulations), and juicy behavior through the incorporation of healthy oil/myoglobin aqueous solution and selective adjustment of pH through the in-situ incorporation of buffering agents.

Furthermore, as described above, different technologies to generate alternatives meat products currently exist in the market. Generally, these can be divided into two categories: 1) "cultured meat" derived from real animal cells, specifically muscle cells or stem cells, in a process known as cell-based agriculture (Boston Meats, Inc. and Gelatex, Inc) and 2) "plant meat" derived from plant sources using extrusion as the main technology to produced textured vegetable proteins (TVP) to simulate the ground meat texture (Impossible Meat and Beyond Food). The meat alternatives in these two categories, however, have the problems and disadvantages described above.

The present disclosure provides advantages over the currently existing meat alternatives that are described throughout this disclosure. In various embodiments, the present disclosure describes implementing the use of a centrifugal spinning process (e.g., the Forcespinning® method) to produce in situ muscle-like nanofibers systems with fat (healthy oils) content and textures modulations. Through a complex hierarchical nanofiber design, nanofiber systems with selective distribution of components (proteins, fat, myoglobin, water, etc.) result in a product with homogeneous texture, color, taste, presence of liquids (oils/water), and sources of amino acid and myoglobin. Accordingly, meats produced with this complex hierarchical nanofiber design may be more beneficial for human consumption, more environmentally conscious, and better resemble typical animal meats.

Example Procedure for Production of Muscle-Like Nanofiber Systems

An example embodiment of a procedure for the design and production of muscle-like nanofiber systems is described below:

1. Solution Preparation:

Spinnable Components Solution Preparation (Solution 1, S1):

The spinnable components are polymers or mix of polymers capable of forming fiber structures. The polysaccharide polymers are the main component in this phase. However, gelatin, zein, and other proteins are also viable for fiber production. Solution 1 could be prepared by one polymer (polysaccharide or protein), or by different combinations of at least two components. These components are mixed using deionized water as a solvent in the ratio established in Table I. For systems prepared with chitosan (CH), it may be necessary to add citric acid before the addition of CH; once the CH is completely dissolved, the second component is added. For systems prepared with gelatin (GL), after GL addition, it may be necessary to heat the system (40-50° C.) in order to get the completed dissolution of GL. Finally, the systems are left for 24 h in constant agitation at the temperature of dissolution.

TABLE I (Possible polymer combinations in Solution 1, S1)

| Polymers | Combinations | | | | | |
|---|---|---|---|---|---|---|
| | 1 | 2 | 3 | 4 | 5 | 6 |
| Alginate (AL) | X | | | X | | |
| Pullulan (PL) | X | X | X | | | X |
| Chitosan (CH) | | X | | | X | |
| Zein (ZN) | | | X | | | |
| Gelatin (GL) | | | | X | X | X |
| Ratio in wt. %: | PL/AL (70-85%)/ (30-15%) | PL/CH (70-85%)/ (30-15%) | PL/ZN (70-85%)/ (30-15%) | GL/AL (70-85%)/ (30-15%) | GL/Cs (70-85%)/ (30-15%) | GL/PL (70-85%)/ (30-15%) |

Protein Solution Preparation (Solution 2, S2):
  The protein (e.g., soy protein) or mix of protein (e.g., soy with sodio caseinate or soy with whey protein) is/are dissolved/dispersed in deionized water, the pH may be adjusted (e.g., acid or basic), using buffering agents, based on the desired final product effect. Once the pH is adjusted, the system is left for 24 h in constant agitation.
Mix of Solution (Solution 3, S3):
  Once the previous solutions are prepared, the mix of solutions (S1 with S2) is produced in a ratio based on the desired soy final product concentration. The mixing may be carried out at a high-speed rate using a vortex and leaving the solution under stirring.
Alternative Formation of Solution (Solution 3, S3):
  An alternative approach involves directly combining polysaccharides and proteins within the same system. For example, for preparing a system formed by pullulan and protein, the pullulan is dissolved first in DI water and then the protein(s) in powder form is incorporated by slowly integrating using a vortex and an ultrasonic bath for about 10-15 minutes in order to get a homogeneous solution.
2. Oil Phase Preparation (Emulsion 1, E1):
  In this stage, the healthy oil used as an internal phase of the precursor emulsion is prepared. This oil phase is based on an emulsion made of aqueous solution with myoglobin as an internal phase and oil (e.g., avocado, olive, etc.) as an external phase.
  Once the myoglobin solution is prepared, emulsions with different internals phase are obtained (e.g., 10, 20 and 30 wt. % or higher internal phase) in avocado or olive oil or another healthy oil. For the emulsion preparation, the homogenization time may be between 2 min and 4 min under a speed between 4000 and 11000 rpm. These parameters could be changed based on the homogenization mechanisms used.
3. Precursor Emulsion Preparation (Emulsion 2, E2):
  In this stage, S3 is used as an external phase and E1 as an internal phase of the E2.
Example Emulsion Formulation and Parameters:
  Internal phase (IP): 5-20 wt. %.
  Surfactant: tween 80, sodium casein, among others.
  Homogenization time: between 2 min and 5 min.
  Homogenization speed: 4000-11000 rpm.
  In a small glass vial, the E2 is added and then the S3 based on the 01 W ratio established. Once the two components are added, the system is homogenized using the rpm and the time necessary to get a homogeneous system. The E2 obtained is a multiple emulsion type $W_1/O/W_2$, where the $W_1$ is the myoglobin solution and $W_2$ is the S3 solution.
4. Fiber Production
  Once the E2 system is ready, it is subjected to fiber production in, for example, the Cyclone L-1000 M (FibeRio Technology Corp.). This production system includes a cylindrical spinneret with two nozzles equipped with regular beveled needles (e.g., 30-gauge length, Becton, Dickinson and Company) and eight collectors in the form of metal bars arranged around the spinneret at a distance of 15 cm from the nozzles. For each run, 1-2 mL of emulsion is added to the spinneret, and fiber spinning is carried out using different spinning parameters based on the specific system. Once proper parameters are established, muscle-like nanofibers systems with fat encapsulation are obtained (FIGS. 2A-C show an example of a muscle-like nanofiber system produced according to the disclosed embodiments).
5. Crosslinking Process
  If the formulation has a crosslinking agent such as citric acid, the final fibers may be heated to around 110-120° C. in order to promote the cross-linking reaction and improve the fiber dimensional stability in an aqueous medium.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
    forming a solution of one or more polymers and one or more proteins in a predetermined ratio;
    forming an oil external phase emulsion of myoglobin solution in oil;
    forming a precursor emulsion by combining the solution and the oil external phase emulsion in a predetermined ratio; and
    centrifugally spinning the precursor emulsion to form a three-dimensional fiber structure that includes muscle-like fibers with fat encapsulation of proteins.

2. The method of claim 1, wherein the first one or more polymers includes protein polymers.

3. The method of claim 2, wherein the protein polymers include one or more of the following proteins: alginate, pullulan, chitosan, zein, and gelatin.

4. The method of claim 1, wherein the one or more polymers includes polysaccharide polymers.

5. The method of claim 1, wherein the one or more polymers includes a mixture of two polymers.

6. The method of claim 1, wherein the solution is formed by:
    forming a first solution comprising a mixture of the one or more polymers in water;
    forming a second solution comprising the one or more proteins in water; and
    mixing the first solution and the second solution to form the solution.

7. The method of claim 6, further comprising leaving the first solution in constant agitation for 24 hours before mixing the first solution and the second solution.

8. The method of claim 6, wherein forming the second solution includes dissolving the one or more proteins in the water.

9. The method of claim 1, wherein the one or more proteins includes plant-based protein.

10. The method of claim 1, wherein the one or more proteins includes plant-based protein in combination with one of: gelatin, egg protein, sodio caseinate, and whey protein.

11. The method of claim 1, wherein the solution is formed by directly combining the polymers and the proteins in water.

12. The method of claim 1, wherein the predetermined ratio for the polymers and the proteins is based on a desired final protein product concentration.

13. The method of claim 1, wherein the oil phase emulsion has the myoglobin solution as an internal phase and the oil as an external phase.

14. The method of claim 1, wherein the oil in the oil phase emulsion is one of: avocado oil, olive oil, sesame oil, and safflower oil.

15. The method of claim 1, wherein forming the oil external phase emulsion includes homogenization of the myoglobin and the oil.

16. The method of claim 1, wherein the oil external phase emulsion is the internal phase, and the solution is the external phase in the precursor emulsion.

17. The method of claim 1, wherein the precursor emulsion is formed by:
    combining the solution and the oil external phase emulsion in the predetermined ratio to form, after homogenization, the resultant precursor emulsion.

18. The method of claim 1, further comprising:
    adding a crosslinking agent to the precursor emulsion; and
    activating the crosslinking agent after forming the three-dimensional fiber structure.

19. A method for making a meat substitute, comprising:
    forming a solution by combining a mixture of polymers in water with a plant-based protein in a predetermined ratio;
    forming a meat substitute precursor emulsion by combining the solution and an oil external phase emulsion in a predetermined ratio, wherein the oil external phase emulsion is an emulsion with an internal phase of myoglobin in aqueous solution and external phase of unsaturated oil; and
    centrifugally spinning the meat substitute precursor emulsion to form a three-dimensional meat substitute fiber structure that includes muscle-like fibers with fat encapsulation of the plant-based protein.

20. The method of claim 19, wherein the solution includes the plant-based protein in combination with one of: gelatin, egg protein, sodio caseinate, and whey protein, and wherein the unsaturated oil includes one of: avocado oil, olive oil, sesame oil, and safflower oil.

* * * * *